310-12 SR
FIP8502 OR 4,217,507

United States Patent [19] [11] 4,217,507
Jaffe et al. [45] Aug. 12, 1980

[54] LINEAR MOTOR

[75] Inventors: Wolfgang Jaffe, Roselle Park; Wesley R. Peterson, Bound Brook, both of N.J.

[73] Assignee: The Singer Company, Stamford, Conn.

[21] Appl. No.: 2,045

[22] Filed: Jan. 8, 1979

[51] Int. Cl.[2] .............................................. H02K 41/02
[52] U.S. Cl. ........................................ 310/12; 310/14; 310/30; 335/229
[58] Field of Search .................................... 310/12-15, 310/103, 30; 335/229, 230, 251, 255

[56] References Cited

U.S. PATENT DOCUMENTS

| | | | |
|---|---|---|---|
| 3,304,449 | 2/1967 | Pohlman et al. | 310/103 |
| 3,381,181 | 4/1968 | Weathers | 335/251 X |
| 3,389,355 | 6/1968 | Schroeder, Jr. | 310/14 X |
| 3,419,739 | 12/1968 | Clements | 310/12 X |
| 3,484,629 | 12/1969 | Kunz | 310/15 |
| 3,579,001 | 5/1971 | Pelenc | 310/13 |
| 3,656,015 | 4/1972 | Gillum | 310/13 |
| 3,666,977 | 5/1972 | Helms | 310/13 |
| 3,740,594 | 6/1973 | Casey | 310/30 |
| 3,751,693 | 8/1973 | Gabor | 310/13 |
| 3,984,706 | 10/1976 | Inouye | 310/12 |
| 4,016,441 | 4/1977 | Herr et al. | 310/13 |
| 4,127,835 | 11/1978 | Knutson | 335/229 X |

*Primary Examiner*—Donovan F. Duggan
*Attorney, Agent, or Firm*—Robert E. Smith; Edward L. Bell

[57] ABSTRACT

A linear motor construction in which a plurality of parallelpiped shaped permanent magnets are retained within an easily molded spool having an axial bore formed through the axis thereof. A coil which may be electrically excited is wound about the spool and produces a magnetic field when excited, which reacts with the field produced by the permanent magnets to cause linear motion in a ferro-magnetic, cylindrical armature which is slidably contained within the axial bore.

3 Claims, 3 Drawing Figures

LINEAR MOTOR

BACKGROUND OF THE INVENTION

1. Field of the Invention

This invention relates to the construction of linear motors in which small, low cost permanent magnets are employed in conjunction with an electrically energized coil to bias the motor to produce linear excursions of an armature. The linear motor disclosed herein is intended to be constructed with small permanent magnets which are easily obtainable at low cost and which may be readily assembled in a molded housing around which a coil of electrically conductive wire may be easily wound.

2. Description of the Prior Art

Prior known small linear motors have commonly employed ring magnets with one magnetic pole being on the inside diameter and the opposite pole being on the outside diameter of the ring. Such magnets have proven costly to produce, with the result being that the linear motors in which they are used have a disadvantageously high cost. It is desirable to produce a small linear motor which may be easily assembled from a minimum number of easily obtainable, low cost parts.

SUMMARY OF THE INVENTION

It is an object of this invention to provide a linear motor which may be used in sewing machines or similar applications in which the motor employs low cost rectangular permanent magnets.

Another object is to provide a linear motor which is easily assembled.

Still another object is to provide a linear motor which may be constructed in a small size to fit within the confines of a sewing machine or similar appliance.

The above and other objects are achieved by assembling a plurality of rectangular magnets within a cylindrical, spool-shaped core having an axial bore containing an armature. The permanent magnets are inserted in wedgeshaped cavities uniformily formed within the spool to surround the axial bore. The permanent magnets are inserted into the cavities with like magnetic poles directed toward the axial bore. A coil of wire is wrapped about the spool and may be electrically excited to produce a magnetic field. An external steel cylinder surrounds the coil to improve the magnetic circuit of the motor. The field produced by the magnets magnetically cooperates with the magnetic field produced when the coil is electrically excited to effect a linear movement of the armature. The armature may be mechanically connected to a mechanical apparatus to which it is desired to selectively apply a linear force.

BRIEF DESCRIPTION OF THE DRAWINGS

The above and other objects of this invention will become evident from a full and complete understanding of the preferred embodiment which is hereinafter set forth in such detail as to enable those skilled in the art to readily understand the function, operation, construction and advantages of it when read in conjunction with the accompanying drawings in which.

DESCRIPTION OF THE PREFERRED EMBODIMENT

Figure 1:
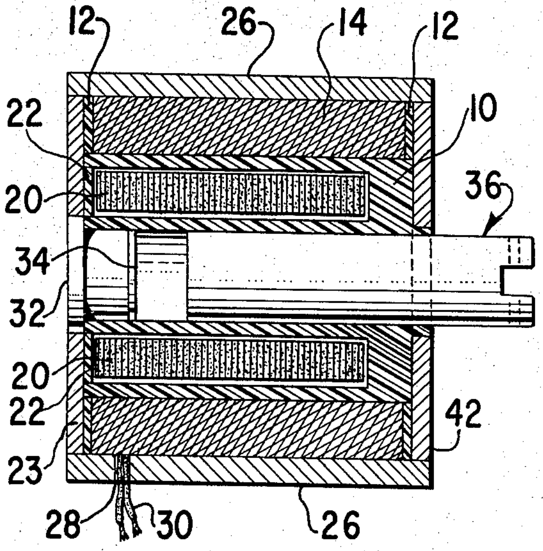
FIG. 1 is a side view in section of a linear motor constructed in accordance with the teachings of this invention.

Referring to the drawings, FIG. 1 shows a preferred embodiment of a linear motor adapted for use preferably to impart needle zigzag motion or to impart work feed controlling movements in a household sewing machine having a laterally zigzagging needle and a fabric feeding mechanism cooperating to produce ornamental pattern stitching. A sewing machine to which a linear motor of this invention may have utility is disclosed in U.S. Pat. No. 3,984,745 which issued on Oct. 5, 1976, to Philip F. Minalga which is incorporated herein by reference.

Figure 2:
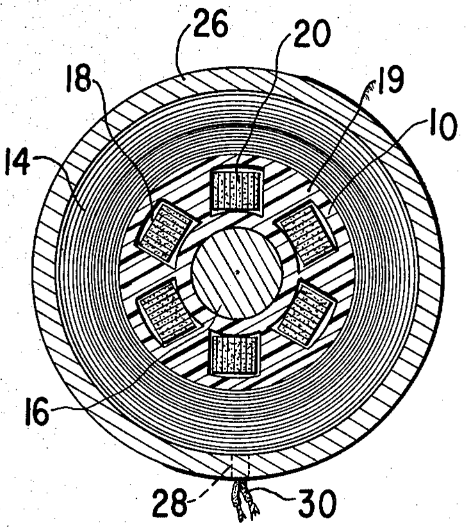
FIG. 2 is an end view in section of the motor.
Figure 3:
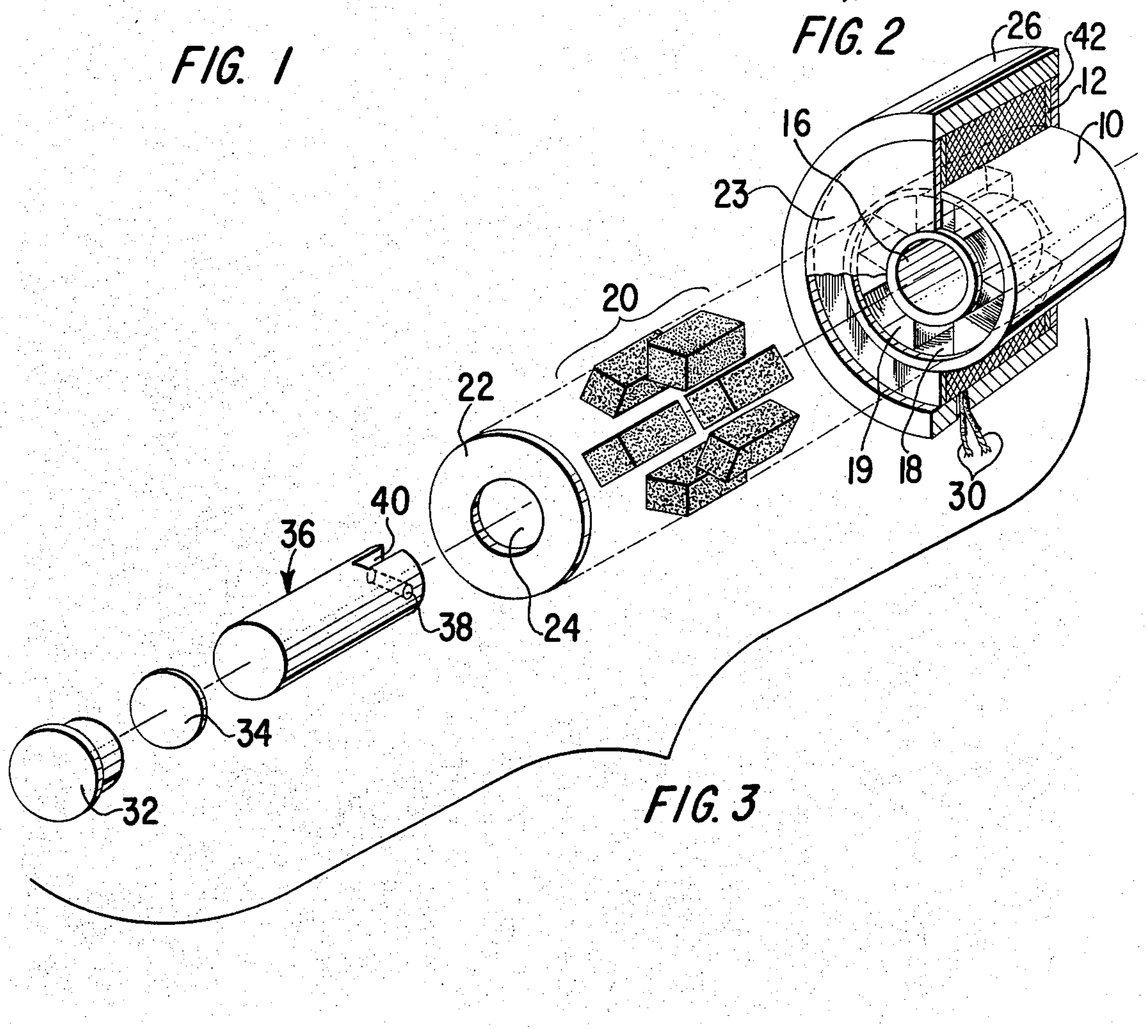
FIG. 3 is a disassembled perspective view of the linear motor.

Generally the motor comprises a cylindrical spool 10 which is constructed from an easily molded, non-magnetic material such as a plastic or nylon. The spool 10 is circular in shape and has a central axis traversing the length thereof. A pair of walls, shown at 12 in FIG. 1, extend radially away from the spool 10 at either extremity thereof. The walls 12 act to contain a coil of electrically conductive wire 14 which is preferably wound on the spool 10. FIG. 2 shows that the spool 10 contains an axial bore 16 formed therethrough along the central axis thereof. The spool 10 also has formed therein a plurality of cavities 18 which are uniformily spaced at an equal radial distance about the bore 16 and which have axis extending parallel to the central axis of the spool 10. Preferably, the cavities 18 have wedgeshaped separators 19 formed therebetween to segregate adjacent cavities, one from the other. Preferably the cavities 18 are open at one extremity thereof to facilitate the introduction of a parallel piped shaped, permanent magnets 20 therein. The magnets 20, which have spaced faces of opposite magnetic polarity, are made from a permanently magnetizable material as for example of ceramic or semarium cobalt and are inserted into the cavities 18 so that similar magnetic poles face toward the axial bore 16 and opposite magnetic poles face away from the axial bore 16. A circular retainer ring 22, having a central bore 24 encloses the open extremities of the cavities 18. A first snap ring 23, having a circular aperture at the center thereof, is formed from a ferro-magnetic material and holds the retainer ring 22 against the spool 10. Closely fitted about the coil 14 is a cylindrical enclosure ring 26 which is preferably constructed from a ferromagnetic material. The ring 26 preferably contains an aperture 28 through which a pair of wires 30 may be drawn for connecting the coil 14 to a source of electricity (not shown). A ferro-magnetic cylindrical end cap 32 is press fit into the aperture of the first snap ring 23 and partially extends into the axial bore 16. A circular separator 34 which is constructed of a non-metallic material such as rubber or nylon is fastened to the extremity of the end cap 32 which resides within the bore 16.

A cylindrical armature 36 preferably having a diameter selected to permit it to loosely slide within the bore 16 is fitted within the bore 16 and operatively connects the linear motor to a mechanism to be actuated thereby. Preferably the armature 36 is constructed from a ferromagnetic material such as a low carbon steel which has a low magnetic retentivity. One extremity of the armature 36 extends through an extremity of the spool 10 and contains a bore 38 which is formed perpendicular to the axis of the armature, and a slot 40 to facilitate mechanical interconnection of the linear motor to a mechanism to be actuated thereby. The extremity of the spool 10 through which the armature 36 extends has a second snap ring 42 preferably formed of a ferro-magnetic material which is press fit within an extremity of the enclosure ring 26.

Operation of the linear motor is effected by applying an electrical signal to the wires 30 which causes a magnetic field to be produced by the coil 14. The field reacts with the magnetic field produced by the permanent magnets 20 and results in the armature 36 being moved outwardly in a direction away from the end cap 32. When the electrical current energizing the coil 14 is removed, the magnetic field produced by the coil 14 collapses and the armature 36 is drawn inwardly by the field produced by the permanent magnets 20 to its rest position. Obviously, any mechanism connected to the linear motor will partake of the linear motion of the armature 36, which may be selectively jogged by selectively controlling the application of a signal to the coil 14. But one example of a sewing machine to which the teachings of this invention may be successfully applied may be had by reference to the aforementioned patent to Minalga or by reference to U.S. patent application Ser. No. 907,654, which was filed on May 22, 1978 by J. Brown, J. Herr, W. Jaffe, and W. Peterson which discloses a Diaphragm Pump for Needle Threading, the teachings of which are incorporated herein by reference.

Numerous alterations of the structure herein disclosed will suggest themselves to those skilled in the art in light of the above teachings. However, it is to be understood that the present disclosure relates to a preferred embodiment which is for the purpose of illustration only, and not to be construed as a limitation of the invention. All such modifications which do not depart from the spirit of the invention are intended to be included within the scope of the appended claims.

We claim:

1. A linear motor comprising a circular spool formed from a non-metallic, easily molded material, said spool having a central axis with an axial bore formed therethrough, a plurality of cavities formed in said spool parallel to said central axis, said cavities being equally spaced around said axis, said spool also having a plurality of separator ribs separating said cavities one from the other, a plurality of permanent magnets having spaced faces of opposite magnetic polarity, said magnets being received by said cavities in said spool each with a face of like polarity directed toward said axial bore and each with a face of the opposite polarity directed away from said axial bore, a coil of electrically conductive wire wrapped about said spool, means for connecting said coil to a source of electricity, and a cylindrical armature constructed of a ferro-magnetic material slidably received by said axial bore, whereby a magnetic field produced by said permanent magnets reacts with a magnetic field produced when said coil is electrically excited to thereby linearly move said armature within said axial bore.

2. The arrangement as set forth in claim 1 further comprising a ferro-magnetic steel cylinder encircling said circular spool.

3. The arrangement as set forth in claim 1 wherein said spool has radially extending from either extremity thereof a wall for containing said electrically conductive coil.

* * * * *